(12) United States Patent
Zhu et al.

(10) Patent No.: US 8,428,050 B2
(45) Date of Patent: Apr. 23, 2013

(54) RADIO COMMUNICATION SYSTEM, RADIO ACCESS METHOD, ACCESS POINT AND GATEWAY

(75) Inventors: Wei Zhu, Shenzhen (CN); Bo Hu, Shenzhen (CN); Tao Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 965 days.

(21) Appl. No.: 12/417,410

(22) Filed: Apr. 2, 2009

(65) Prior Publication Data

US 2009/0196233 A1    Aug. 6, 2009

Related U.S. Application Data

(63) Continuation of application No. PCT/CN2007/070102, filed on Jun. 12, 2007.

(30) Foreign Application Priority Data

Oct. 25, 2006   (CN) .......................... 2006 1 0149806

(51) Int. Cl.
*H04W 4/00*      (2009.01)
*H04L 12/66*     (2006.01)
*H04L 12/28*     (2006.01)

(52) U.S. Cl.
USPC ............................. 370/352; 370/328; 370/389

(58) Field of Classification Search .................. None
See application file for complete search history.

(56) References Cited

U.S. PATENT DOCUMENTS 7,206,318 B2 *  4/2007  Keller ........................... 370/433
(Continued)

FOREIGN PATENT DOCUMENTS

| CN | 1411223 A | 4/2003 |
| CN | 1756237 A | 4/2006 |

(Continued)

OTHER PUBLICATIONS

Translation and Written Opinion of the International Searching Authority, PCT/CN2007/070102, Sep. 11, 2007, 6 pages.

(Continued)

*Primary Examiner* — Hassan Phillips
*Assistant Examiner* — Hicham Foud
(74) *Attorney, Agent, or Firm* — Slater & Matsil, L.L.P.

(57) ABSTRACT

Embodiments of the present invention disclose a radio communication system and a radio access method. In accordance with the embodiments of the present invention, an AP with a PDP forward function unit forwards service traffic accessing an AS to a Packet Radio Service Gateway Support Node, and sends Internet service traffic to the Packet Radio Service Gateway Support Node or directly sends the Internet service data to the Internet via a configured forwarding interface according to the service property of the service traffic. Embodiments of the present invention further disclose an Access Point and a gateway. Therefore, the load of network elements of a mobile network is reduced; meanwhile, the control and the management of the high increment value services by operators can be guaranteed. The investment of the CS network can be protected by the gateway as a concentrator of Access Points and a forwarding node of CS services in the embodiments of the present invention.

15 Claims, 5 Drawing Sheets

U.S. PATENT DOCUMENTS

| | | | | |
|---|---|---|---|---|
| 7,346,368 B2 * | 3/2008 | Llanos et al. | 455/550.1 |
| 7,394,795 B2 * | 7/2008 | Chitrapu et al. | 370/338 |
| 7,423,993 B2 * | 9/2008 | Pasanen et al. | 370/331 |
| 7,477,619 B2 * | 1/2009 | Lee et al. | 370/328 |
| 7,489,919 B2 * | 2/2009 | Cheng | 455/411 |
| 7,606,190 B2 * | 10/2009 | Markovic et al. | 370/328 |
| 8,073,428 B2 * | 12/2011 | Khetawat et al. | 455/411 |
| 8,078,178 B2 * | 12/2011 | Islam et al. | 455/445 |
| 2001/0046839 A1 * | 11/2001 | Latva-Aho et al. | 455/3.05 |
| 2002/0101848 A1 | 8/2002 | Lee et al. | |
| 2003/0169725 A1 * | 9/2003 | Ahmavaara et al. | 370/352 |
| 2006/0072512 A1 | 4/2006 | Das et al. | |
| 2006/0262778 A1 * | 11/2006 | Haumont et al. | 370/356 |
| 2007/0041360 A1 * | 2/2007 | Gallagher et al. | 370/352 |
| 2007/0076715 A1 * | 4/2007 | Bauer et al. | 370/390 |
| 2007/0297390 A1 * | 12/2007 | Skog et al. | 370/352 |
| 2008/0064390 A1 * | 3/2008 | Kim | 455/425 |
| 2008/0181204 A1 * | 7/2008 | Gallagher et al. | 370/354 |
| 2009/0059848 A1 * | 3/2009 | Khetawat et al. | 370/328 |
| 2010/0165901 A1 * | 7/2010 | Kim | 370/312 |

FOREIGN PATENT DOCUMENTS

| | | |
|---|---|---|
| GB | 2428942 A | 2/2007 |
| WO | 2005029881 A2 | 3/2005 |
| WO | WO 2005/060292 A1 | 6/2005 |
| WO | WO 2006/078562 A2 | 7/2006 |
| WO | 2006114628 A2 | 11/2006 |

OTHER PUBLICATIONS

3$^{rd}$ Generation Partnership Project; Technical Specification Group GSM/EDGE Radio Access Netowrk; Generic access to the A/Gb interface; Stage 2 (Release 6), Jun. 2006, 71 pages, 3GPP TS 43.318, vol. 6.7.0.

European Office Action, Application No. 07 117 728.1-2412, Jan. 27, 2010, 4 pages.

European Search Report, Application No. 07117728.1-2412, Feb. 7, 2008, 9 pages.

Chinese Office Action with Partial Translation, 3GPP TR 25.cde, Sep. 2006, 38 pages, vol. 0.3.0.

European Office Action, European Application No. 07 117 728.1-2412, Applicant: Huawei Technologies Co., Ltd., Dated: Feb. 17, 2011, 4 pages.

3GPP TR 25.cde V0.3.0: 3rd Generation Partnership Project; Technical Specification Group Radio Access Network; HSPA Evolution beyond Release 7 (FDD); (Release 7), Sep. 2006, p. 1-29.

3Gpp TR 23.882 V0.1.1: 3rd Generation Partnership Project; Technical Specification Group Services and System Aspects; 3GPP System Architecture Evolution; Report on Tecnical Options and Conclusions (Release 7), Apr. 2005, p. 1-15.

Wang, Yonggang, Brief Introduction to 3G LTE, Communications Today, Jun. 2006, p. 6.

* cited by examiner

RADIO COMMUNICATION SYSTEM, RADIO ACCESS METHOD, ACCESS POINT AND GATEWAY

CROSS-REFERENCE TO RELATED APPLICATIONS

This application is a continuation of International Application No. PCT/CN2007/070102, filed on Jun. 12, 2007, which claims priority to Chinese Patent Application No. 200610149806.2, filed on Oct. 25, 2006, both of which are hereby incorporated by reference in their entireties.

FIELD OF THE INVENTION

The present invention relates to radio communication technologies, and more particularly, to a radio communication system, a radio access method, an Access Point and a gateway.

BACKGROUND OF THE INVENTION

Along with the development of Internet services and the application of broadband access networks and radio networks, extensive attention is paid to the fast and convenient access networks. Meanwhile, researches on combining advantages of a mobile access network with advantages of a fixed access network are becoming a new focus of the communication industry for a better utilization of the existing network resources and a better control of the costs for the operators of network devices.

FIG. 1 is a schematic diagram illustrating a conventional Universal Mobile Telecommunications System (UMTS) network. The network includes a Mobile Station (MS), a Radio Network Controller (RNC), a base station (Node B) and various network devices.

The MS which is a user terminal device of the UMTS has such functions as radio measuring, service establishing, packet receiving/transmitting and mobility managing. The RNC and the NodeB which provide the MS with the radio access resource have such functions as radio access controlling, air interface accessing of data and voice, radio resource managing and mobility managing. Network devices of the system include a Mobile Switched Center/Visit Location Register (MSC/VLR), a Home Location Register (HLR), a Gateway Mobile Switched Center (GMSC), a General Packet Radio Service (GPRS), a Gateway GPRS Support Node (GGSN), a Service GPRS Supporting Node (SGSN) and etc. The network devices of the system have such functions as network access controlling, packet routing and forwarding, mobility managing and network managing.

FIG. 2 is a schematic diagram illustrating the structure of a conventional radio communication system. With reference to FIG. 2, in the conventional radio communication system, an Access Point (AP) which implements the function of a Node B connects to the RNC via an interface between the RNC and the Node B (IUB) interface. Upon concentrating a great number of APs, the RNC connects to such a core network device of a Circuit Switched (CS) domain as a Mobile Switched Center (MSC) via an IU-CS interface, and connects to such a core network device of a Packet Switched (PS) domain as an SGSN and a GGSN via an IU-PS interface.

The following disadvantages are found during accessing the network with the system as shown in FIG. 2. Both the Internet service and the service operating in the service platform provided by operators need to forward service between the RNC and the Internet or between the RNC and the service platform provided by operators via a GGSN and an Access Gateway (AG) which has the function of an SGSN, which leads to a large processing load of the AG and the GGSN. The Internet service and the service operating in the service platform provided by operators both belong to PS services. The Internet service refers to a WEB service which may be accessed through the PS. The service operated in the service platform provided by operators refers to a service providing a high increment value for operators, and the service is controlled and managed by operators.

A great number of APs concentrate at the RNC and all service traffic of the APs needs to pass through the RNC, and the RNC also needs to process air interface protocol stacks. Therefore, the RNC has an excessive processing load and a limited number of APs can be administrated.

In addition, in the conventional network architecture, a Frame Protocol (FP) which requires a higher Quality of Service (QOS) is used as a transfer protocol in the IUB interface between the AP and the RNC. A home wideband service which provides a lower QOS is used as an IP transfer mode between the AP and the RNC, and the IP transfer mode may lead to an abnormal operation of the FP protocol in an extreme situation.

In other networks, such as a GPRS network, a Code Division Multiple Access (CDMA) 2000 network and a Time Division-Synchronous-Code Division Multiple Access (TD-SCDMA) network, a similar problem also exists.

SUMMARY OF THE INVENTION

In view of the above, embodiments of the present invention provide a radio communication system, a radio access method and an Access Point. By using the embodiments of the present invention, the load of a network element in a mobile network can be reduced; meanwhile, the control and management of the high increment value services by the operators can be guaranteed.

Embodiments of the present invention also provide a gateway as a concentrator of the APs and a forwarding node of the CS services to control the investment of CS network.

A radio communication system includes:

an Application Server, AS, for providing services having service traffic with a first service property; and an Access Point, AP, communicating with the AS via a Packet Radio Service Gateway Support Node, for forwarding the service traffic with the first service property to the Packet Radio Service Gateway Support Node via a first forwarding interface; and the Packet Radio Service Gateway Support Node forwarding the service traffic to the AS.

An AP in a communication system includes:

a Packet Data Protocol, PDP forward function unit, for forwarding service traffic with a first service property to a Packet Radio Service Gateway Support Node via a first forwarding interface, the service traffic being forwarded by the Packet Radio Service Gateway Support Node to an Application Server, AS providing services having the service traffic with the first service property.

A gateway in a communication system includes:

an Access Point, AP control unit, for receiving Circuit Switched, CS service traffic from an AP communicating with the AS via a Packet Radio Service Gateway Support Node, forwarding the CS service traffic to a CS domain, the CS service traffic being received by a Radio Network Controller function unit of the AP from a mobile station.

A radio access method in a communication system, the communication system having an Access Point in communication with an Application Server, AS providing services having service traffic with a first service property, the method includes:

receiving, by an Access Point, service traffic with the first service property; and forwarding, by the Access Point, the service traffic with the first service property to the AS via a Packet Radio Service Gateway Support Node.

It can be seen from the above technical solution that, in accordance with the radio communication systems, the radio access method and the Access Point provided by embodiments of the present invention, an AP with a PDP forward function unit may forward the received service traffic accessing an AS to a Packet Radio Service Gateway Support Node according to the service property of the service traffic; the Packet Radio Service Gateway Support Node forwards the service traffic to the service platform of operators, and performs the service charging. Therefore, the load of a network element in a mobile network can be reduced; meanwhile, the control and management of the high increment value services by the operators can be guaranteed. In addition, the AP may directly forward the Internet service traffic to the Internet via the configured forwarding interface according to the service property of the service traffic; therefore, the load of Packet Radio Service Gateway Support Node is reduced.

A gateway with an AP control unit is provided by the embodiments of the present invention. The AP control unit as a concentrator of the APs configures forwarding interfaces for services according to the control plane signaling from the AP, and returns the configured forwarding interface parameters to the AP. In addition, the AP control unit as a forwarding node of the CS services performs protocol conversions for the CS service traffic received from the AP and sends the CS service traffic to the CS domain. Therefore, many APs and devices of the CS domain may connect to the gateway provided by the embodiments of the present invention, and the investment of the CS network is controlled.

DETAILED DESCRIPTION OF THE EMBODIMENTS

Figure 1:
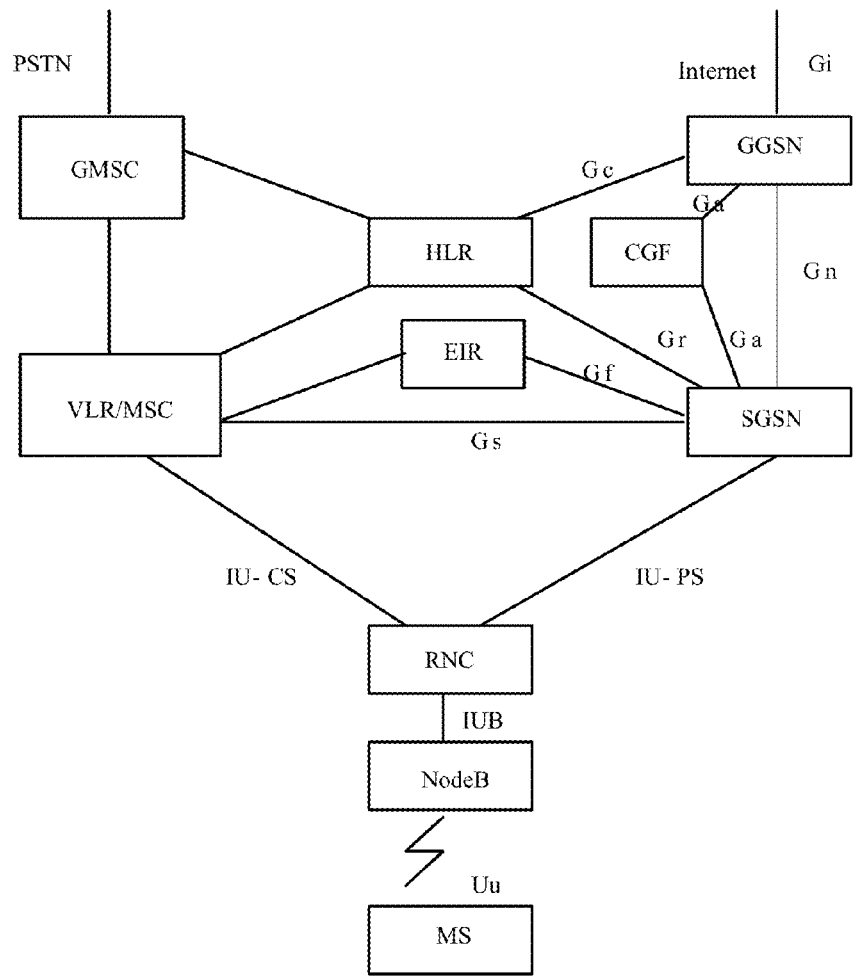
FIG. 1 is a schematic diagram illustrating a conventional UMTS network.
Figure 2:
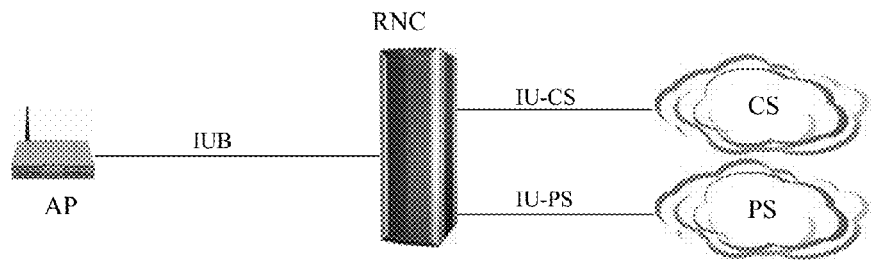
FIG. 2 is a schematic diagram illustrating the structure of a conventional radio communication system.

The present invention is further described as follows with reference to the embodiments and accompanying drawings for a more explicit explanation of the object, technical solution and beneficial effects of the present invention.

A radio communication system, a radio access method, an Access Point (AP) and a gateway are disclosed by embodiments of the present invention. The AP with a Packet Data Protocol (PDP) forward function unit may directly forward the received service traffic accessing an AS, i.e. service traffic providing a high increment value for operators, to a Packet Radio Service Gateway Support Node via a configured forwarding interface according to the service property of the service traffic. And the Packet Radio Service Gateway Support Node further forwards the service traffic and performs the service charging.

The PDP forward function unit may have two forwarding interfaces, one connects to the Packet Radio Service Gateway Support Node and the other connects to the Internet. The PDP forward function unit forwards the received Internet service traffic to the Packet Radio Service Gateway Support Node or directly forwards to the Internet.

A radio communication system provided by embodiments of the present invention includes an AP, a Packet Radio Service Gateway Support Node and an AS. The AP includes a network node function unit and a PDP forward function unit. The PDP forward function unit is a newly-added unit in the AP provided by embodiments of the present invention.

The PDP forward function unit is configured to forward the received service traffic accessing the AS to the Packet Radio Service Gateway Support Node via a configured forwarding interface according to the service property of the received service traffic. The PDP forward function unit may include a first interface connecting to the Packet Radio Service Gateway Support Node and a second interface connecting to an Internet, and send the received Internet service traffic to the Packet Radio Service Gateway Support Node via the first interface or directly to the Internet via the second interface.

The Packet Radio Service Gateway Support Node is configured to forward to the AS the received service traffic accessing the AS, and forward to the Internet the received Internet service traffic.

The AP may further include a Radio Network Controller function unit for receiving service traffic from an MS, forwarding Packet Switched (PS) service traffic to the PDP forward function unit, and encapsulating Circuit Switched (CS) service traffic, forwarding the encapsulated CS service traffic to the CS domain.

The system may further include an AG. The AG has a Service Packet Radio Service Supporting Node function unit and a newly-added AP control unit.

The AP control unit is configured to perform a protocol conversion for the CS service traffic received from the Radio Network Controller function unit and send the converted CS service traffic to the CS domain. The AP control unit is also configured to configure a forwarding interface for a service according to the control plane signaling received from the Radio Network Controller function unit and send the configured forwarding interface parameters to the PDP forward function unit.

Embodiments of the present invention are described in detail by taking a UTMS network as an example, which is not limited to the UTMS network. It should be noted that, the technical solution provided by embodiments of the present invention may also be used in other networks such as a GPRS network, a CDMA2000 network and a TD-SCDMA network; the structure of the above various networks and the function of network element included are basically the same as those of the UMTS network apart from the processing of the physical layer protocol at the radio access side, which is not described here. For example, the network element of a CDMA2000 network has the same function with the GGSN of a UMTS network is a Packet Data Service Node (PDSN).

Figure 3:
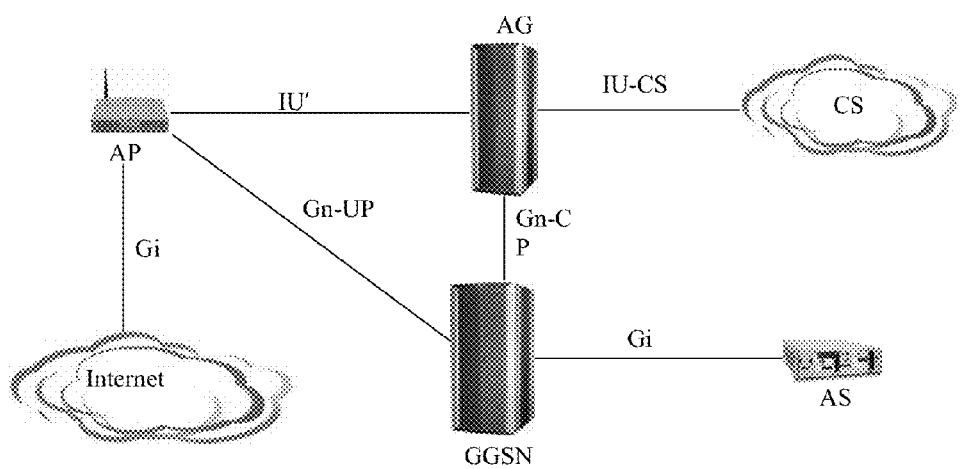
FIG. 3 is a schematic diagram illustrating the structure of a radio communication system in accordance with a first embodiment of the present invention.

FIG. 3 is a structure schematic diagram of a radio communication system in accordance with a first embodiment of the present invention. The system is applied in a UMTS network and includes an AP, an AG, a GGSN and an AS. The GGSN and the AS of a conventional UMTS network can be used as the GGSN and the AS of the system.

The AP of the system includes a NodeB function unit, a RNC function unit and a PDP forward function unit of GSN. The detailed implementations of a network node function unit, a Radio Network Controller function unit and a PDP forward function unit in a UMTS network are respectively the NodeB function unit, the RNC function unit and the PDP forward function unit of GSN.

The AG includes an SGSN function unit and an AP control unit. The detailed implementation of a Service Packet Radio Service Supporting Node function unit in a UMTS network is the SGSN function unit which may implement all the functions of a conventional SGSN, and connect to each network element of the network via the same interface as the conventional SGSN, for example, the AG connects to an HLR via a Gr interface, connects to a GGSN via a Gn interface, and connects to an MSC via a Gs interface.

The AP connects to the AG via an IU' interface. The IU' interface protocol includes a standard IU-CS interface protocol, an IU-PS interface control plane protocol and a few private messages.

The system supports not only a PS service such as an Internet service and a service providing a high-attacking value for operators, but also a conventional CS service such as an Adaptive MultiRate (AMR) voice service or a Visible Phone (VP) service.

For uplink service traffic, the AP is configured to directly forward Internet service traffic to the Internet via a Gi interface, forward to the GGSN service traffic accessing the high increment value service via a Gn-UP interface, and encapsulate the CS service traffic into a CS service data package with the format of an IU interface User plane Protocol (IUUP) package, then send the CS service data package to the AG via an IP transmission network of the IU' interface using an IUUP/UDP/IP as the protocol stack.

The GGSN is configured to forward the received service traffic accessing the high increment value service to the AS via a Gi interface, and perform the service charging.

The AG is configured to forward the received CS service data package to the CS domain via a standard IU-CS interface using an IUUP/AAL2/ATM as the protocol stack.

When the IU-CS interface uses the IP protocol stack for transfer, the AG directly forwards the received CS service data package to the CS domain; otherwise, the AG forwards the received CS service data package to the CS domain after converting the IP protocol stack into an ATM protocol stack. The AG makes the same transfer protocol conversion and forwarding for a message of Radio Access Network Application Part (RANAP) and a message of Non Access Stratum (NAS) of the singling protocol for the IU interface in the signaling plane.

For downlink service traffic, the AS is configured to send the downlink service traffic to a GGSN via a Gi interface. The GGSN is configured to forward the downlink service traffic from the AS to an AP via a Gn-UP interface and performing the service charging.

The AG is configured to send the downlink CS service data package from the CS domain to the AP via an IU' interface. When the IU-CS interface uses the IP protocol stack for transfer, the AG directly forwards the received CS service data package to the AP via the IP; otherwise, the AG forwards the received CS service data package to the AP after converting the ATM protocol stack into the IP protocol stack.

The AP is configured to receive the CS service data package from the AG, extract the CS service information from the IUUP package, and forward the information to the MS in the format of an air interface protocol stack.

In this embodiment, the function of the NodeB is combined with the function of the RNC by integrating a RNC function unit into the AP; therefore, the transmission costs are saved, and the conventional problems are avoided, including the limited number of administrable APs and the excessive load of the RNC caused by a great number of APs concentrating at the RNC. Furthermore, the FP protocol no longer needs to be used as the transfer protocol between the AP and the RNC and the QOS requirement of an IP transmission network required by the system is reduced.

Figure 4:
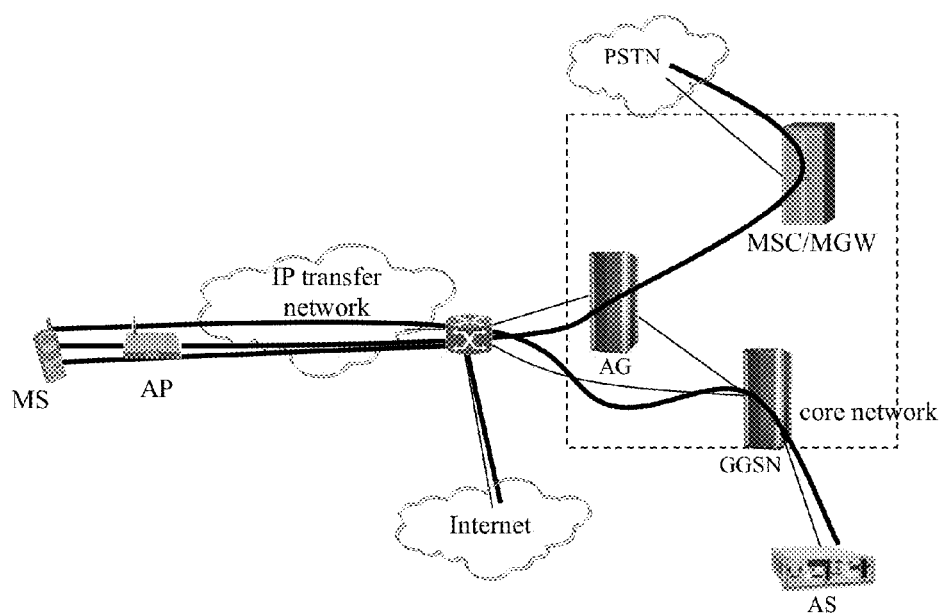
FIG. 4 is a schematic diagram illustrating service traffic of a user plane of the system as shown in FIG. 3.

FIG. 4 is a schematic diagram illustrating a data stream of a user plane of the system as shown in FIG. 3. Referring to FIG. 4, the path for the CS service traffic using the system as shown in FIG. 3 includes:

Mobile Station (MS) ⇔ AP ⇔ IP transmission network ⇔ AG ⇔ CS domain. The AG implements the conversion between the IP protocol stack and the ATM protocol stack. If the IU-CS interface has used the IP protocol stack for transfer, the AG only performs the IP forwarding.

The path of the data stream accessing the high-attacking value service includes: MS ⇔ AP ⇔ IP transmission network ⇔ GGSN ⇔ AS. The GGSN performs the charging of the high increment value service which is precise and complex. In this data stream path, the AG is bypassed to reduce the load of the AG.

The path of the data stream accessing the Internet includes: MS ⇔ AP ⇔ IP transmission network ⇔ Internet. The data stream accessing the Internet is forwarded only through the AP instead of devices of the network infrastructure, so as to greatly reduce the load of the network infrastructure.

With reference to the schematic diagram illustrating the data stream of the user plane as shown in FIG. 4, in the system as shown in FIG. 3, the user plane load of each network element in the network infrastructure may be furthest reduced according to the service property, and then the unit cost of the service traffic is reduced. In this system, since the AP directly connects to the GGSN, the load of the AG may be reduced by bypassing the AG for the PS service user plane data; meanwhile, the control and the management of the high increment value services by the operators can be guaranteed. In addition, a low increment value service as the Internet can be accessed through the system via the AP instead of a device of network infrastructure; therefore, null cost of the access traffic is implemented and the investment of operators is controlled.

Figure 5:
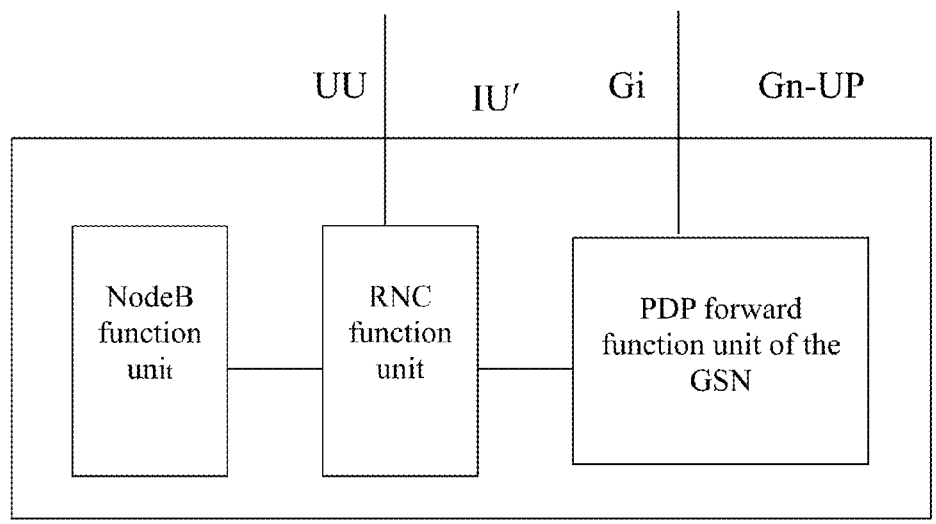
FIG. 5 is a schematic diagram illustrating the structure of an AP of the system as shown in FIG. 3.

FIG. 5 is a schematic diagram illustrating the structure of an AP of the system shown in FIG. 3. The AP includes a NodeB function unit, a RNC function unit and a PDP forward function unit of the GSN.

The NodeB function unit includes an operation and maintenance unit, a local maintenance unit, a remote maintenance unit, a NodeB signaling unit, a transfer unit, a public function unit, a NodeB user plane, a hardware platform and a software platform and etc. The NodeB function unit is a unit included in the conventional AP. The function and the connection relationship of each unit are the common knowledge of those skilled in the art, which will not be further described herein.

The RNC function unit connects to the NodeB function unit and exchanges the service traffic with an MS via the UU interface, and exchanges the CS service traffic and the control plane signaling with the AG via the IU' interface. The RNC function unit receives service traffic from the MS, forwards the PS service traffic to the PDP forward function unit of the GSN, and encapsulates the CS service traffic into the format of an IUUP package and then forwards the CS service data package to the CS domain.

The RNC function unit determines the service property of service traffic after receiving the service traffic from an MS; if the service traffic is PS service traffic, the RNC function unit forwards the PS service traffic to the PDP forward function unit of the GSN; if the service traffic is CS service traffic, the RNC function unit encapsulates the CS service traffic into the format of an IUUP package and then forwards the CS service data package to the CS domain. After receiving the service traffic from the MS, the RNC function unit may perform other processing for the service traffic, such as a protocol conversion processing, which is the same as the conventional processing and will not be further described herein.

The PDP forward function unit of the GSN connects to the RNC function unit and exchanges the information in the conventional GPRS Tunneling Protocol (GTP) packet format. The PDP forward function unit of the GSN includes two interfaces: one is a Gi interface, and the other is a Gn-UP interface. The PDP forward function unit is configured to forward to the Internet the received service traffic which accesses the Internet via the Gi interface, and forward the service traffic accessing the high increment value service to the GGSN via the Gn-UP interface.

Figure 6:
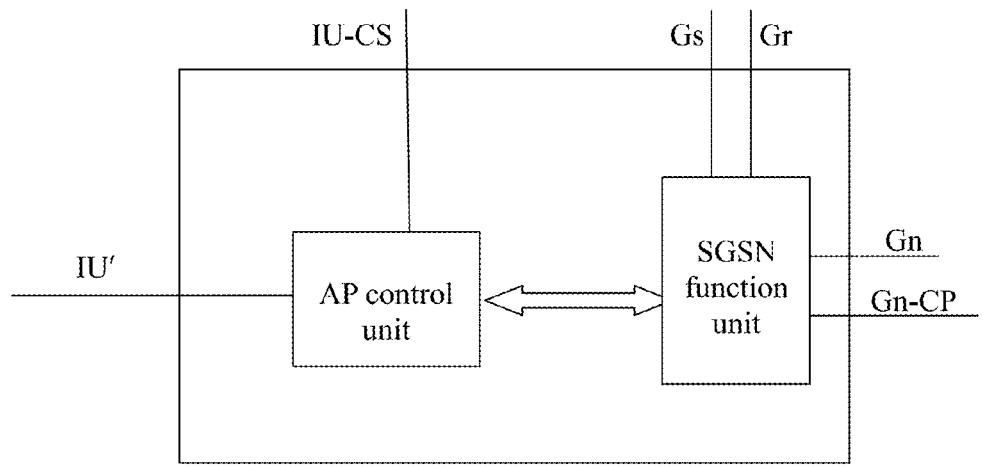
FIG. 6 is a schematic diagram illustrating the structure of an AG of the system as shown in FIG. 3.

FIG. 6 is a schematic diagram illustrating the structure of an AG of the system as shown in FIG. 3. The AG includes an AP control unit and an conventional SGSN function unit in the conventional AG which may implement all the conventional functions of the SGSN and connect to each network element of the network via the same interface as the conventional SGSN, for example, the AG connects to the HLR via a Gr interface, connects to the GGSN via a Gn interface, and connects to the MSC via a Gs interface. The functions of the SGSN function unit and the connection relationships with other network elements of the SGSN function unit are common knowledge of those skilled in the art, which will not be further described herein.

The AP control unit is configured to forward CS service traffic received from the RNC function unit to the CS domain, configure a forwarding interface for a service according to a control plane signaling received from the RNC function unit, and send the configured forwarding interface parameters to the PDP forward function unit of the GSN.

The SGSN function unit connects to the AP control unit via a standard IU-PS interface.

The AP control unit may include a RNC agent unit and a PDP remote control unit.

The RNC agent unit is configured to forward the CS service traffic received from the RNC function unit to the CS domain, and forward the control plane signaling received from the RNC function unit to the PDP remote control unit.

The PDP remote control unit which connects to and exchanges the information with the SGSN function unit is configured to configure a forwarding interface for a service according to the received service control plane signaling, and return the configured forwarding interface parameters to the PDP forward function unit of the GSN in the AP via the RNC agent unit. The PDP forward function unit of GSN may select a forwarding interface for the received service traffic according to the received forwarding interface parameters and the service traffic property.

Figure 7:
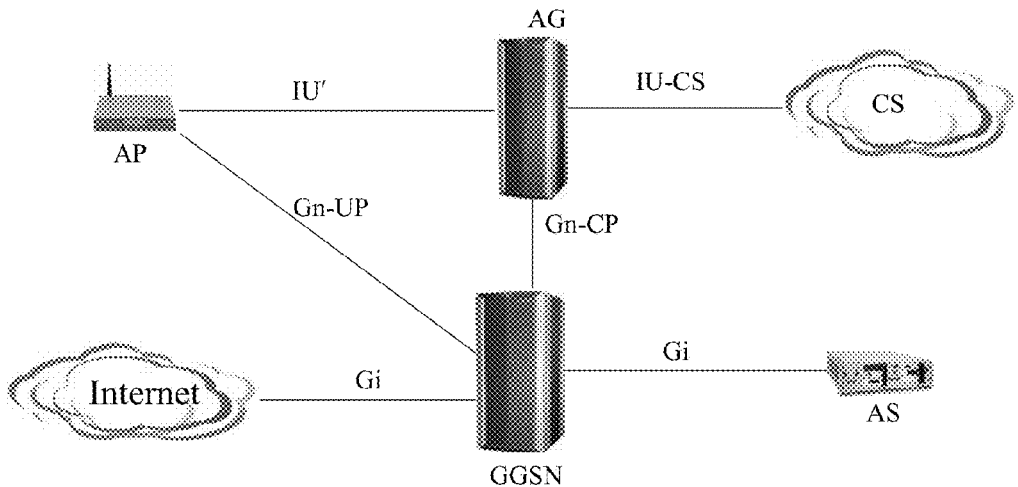
FIG. 7 is a schematic diagram illustrating the structure of a radio communication system in accordance with a second embodiment of the present invention.

FIG. 7 is a schematic diagram illustrating the structure of a radio communication system in accordance with a second embodiment of the present invention. The difference between this system and the system shown in FIG. 3 is that, the PDP forward function unit of the GSN of the AP has only one Gn-UP interface via which the service traffic accessing the Internet and the service traffic accessing the own services of operators are forwarded to the GGSN, and then the GGSN forwards to the Internet the service traffic accessing the Internet and forwards to the AS the service traffic accessing the own services of operators.

All the PS services besides a high-attacking value service may be controlled and managed by the operators by using the system shown in FIG. 7.

The function of system shown in FIG. 7 may be implemented based on the system shown in FIG. 3. The PDP forward function unit of the GSN of the system shown in FIG. 3 has two interfaces, one is a Gi interface, and the other is a Gn-UP interface. The PDP forward function unit of the GSN directly forwards the received Internet service traffic to the Internet via the Gi interface; in practical applications, the PDP forward function unit of the GSN may also forward the Internet service traffic to the GGSN via the Gn-UP interface according to the configured forwarding interface. The GGSN forwards the Internet service traffic to the Internet. The mode with which the service traffic is forwarded to the Internet depends on the forwarding interface configured for the Internet service traffic.

A radio access method provided by embodiments of the present invention includes the following steps.

The AP receives service traffic sent by an MS, and determines the service property of the service traffic; if the service traffic is service traffic accessing an AS, the AP forwards the service traffic to a Packet Radio Service Gateway Support Node via a configured forwarding interface; if the service traffic is Internet service traffic, the AP forwards the service traffic to the Packet Radio Service Gateway Support Node or directly to the Internet.

The GGSN forwards to the AS the received service traffic accessing the AS and forwards to the Internet the received Internet service traffic.

Figure 8:
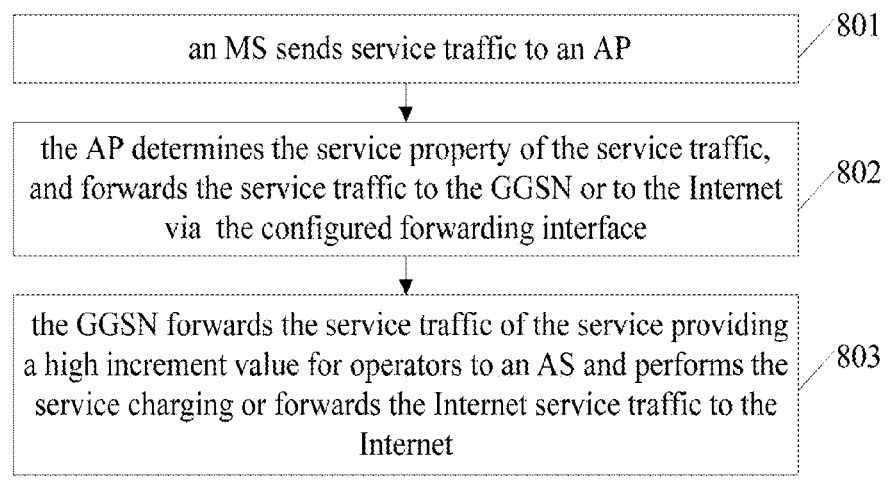
FIG. 8 is a flowchart of a radio access method in accordance with an embodiment of the present invention.

FIG. 8 is a flowchart of a radio access method in accordance with an embodiment of the present invention. By taking a UMTS network as an example, for uplink service traffic, the method includes the following steps.

At step 801, an MS sends service traffic to an AP.

At step 802, the AP determines the service property of the service traffic from the MS, and forwards the received service traffic to a GGSN or an Internet according to a configured forwarding interface.

If the service traffic is service traffic accessing an AS, i.e. the service traffic of the service providing a high increment value for operators, the AP forwards the service traffic to the GGSN via an IP transmission network according to the forwarding interface configured in advance; if the service traffic is Internet service traffic, the AP forwards the service traffic to the GGSN or directly to the Internet via the forwarding interface configured in advance.

At this step, determining the service property of service traffic by the AP includes:

determining, by the AP, the service property of the service traffic according to the Access Point Name (APN) or the destination IP address of uplink data package corresponding to the service traffic.

At step 803, the GGSN forwards to the AS the received service traffic of the service providing a high increment value for operators and performs the service charging for the service providing high increment value for operators or forwards the received Internet service traffic to the Internet.

The forwarding procedure of downlink service traffic is contrary to that of the uplink service traffic, i.e. the AS sends the downlink service traffic of the service providing high increment value for operators to the GGSN; the GGSN performs the charging and sends the received downlink service traffic to the AP via the IP transmission network, and the AP forwards the received downlink service traffic to the MS. The forwarding procedure of the downlink Internet service traffic includes that the AP directly forwards to the MS the received service traffic sent by the Internet, or the GGSN forwards to the AP the received downlink service traffic sent by the Internet and then the AP forwards the service traffic to the MS.

In accordance with the method, provided by the present invention, for accessing the network, the AP and the GGSN directly forward the service traffic of service providing high increment value for operators to each other without passing through the AG; therefore, the load of an AG is reduced; meanwhile, the control and the management of the high increment value services by the operators can be guaranteed.

After the MS sends the service traffic to the AP as described in step 801, if the AP determines that the service traffic is CS service traffic, the method further includes that the AP encapsulates the received uplink CS service traffic into a format of the IUUP package and sends the encapsulated CS service traffic to the CS domain via the IP transmission network.

After the AP encapsulates the uplink CS service traffic, the method further includes that the AP forwards the encapsulated CS service traffic to the AG and then the AG forwards the received uplink CS service traffic to the CS domain.

If the IU-CS interface uses the IP protocol stack for transfer, the AG directly forwards the received uplink CS service traffic to the CS domain; otherwise, the AG forwards the uplink CS service traffic to the CS domain via the IU-CS interface after converting the IP protocol stack into the ATM protocol stack.

The forwarding procedure for the downlink CS service traffic is contrary to that for the uplink CS service traffic, i.e. the CS domain sends the downlink CS service traffic to the AG, the AG forwards the downlink CS service traffic to the AP via the IP transmission network and the AP forwards the received CS downlink service traffic to the MS.

As can be seen from the above embodiments, in accordance with the systems, the method and the Access Point for accessing the network, the AP with a PDP forward function unit may forward the received service traffic accessing the AS to the Packet Radio Service Gateway Support Node according to the service property of the service traffic; the Packet Radio Service Gateway Support Node forwards the service traffic to the service platform of operators, and performs the service charging. Therefore, the load of a network element in a mobile network can be reduced; meanwhile, the control and the management of the high increment value services by the operators can be guaranteed. In addition, the AP of embodiments of the present invention may directly forward the received Internet service traffic to the Internet bypassing from the Gi interface of the AP via the configured forwarding interface; therefore, the load of Packet Radio Service Gateway Support Node is reduced.

A gateway is provided by the embodiments of the present invention with an AP control unit as a concentrator of the APs. The AP control unit configures user plane parameters for services according to service control plane signaling received from the AP and returns the configured parameters to the APs. The AP control unit may be used as a forwarding node of the CS services, which sends the CS service traffic to the CS domain after performing protocol conversions. Therefore, many APs and devices of the CS domain may connect to the gateway provided by embodiments of the present invention, and the investment of CS network is controlled.

In addition, in the embodiments of the present invention, the function of the NodeB is combined with the function of the RNC by integrating a RNC function unit into the AP. Therefore, the transmission costs are saved, and the conventional problems are avoided including the limited number of administrable APs and the excessive load of the RNC caused by a great number of APs concentrating at the RNC. Furthermore, the FP protocol no longer needs to be used as the transfer protocol between the AP and the RNC and the QOS requirement of an IP transmission network required by the system is reduced.

To sum up, the foregoing are only preferred embodiments of the present invention and are not for use in limiting the protection scope of the present invention. Any modification, equivalent replacement and improvement made within the spirit of the present invention should be covered under the protection scope of the present invention.

The invention claimed is:

1. A radio communication system, comprising:
   an Application Server (AS) configured to provide services having service traffic with a first service property; and
   an Access Point (AP) configured to communicate with the AS via a Packet Radio Service Gateway Support Node, the AP comprising a NodeB function unit, a Radio Network Controller function unit and a packet data protocol (PDP) forward function unit, wherein the Radio Network Controller function unit is configured to receive the service traffic with the first service property and to forward the service traffic with the first service property to the PDP forward function unit, the PDP forward function being configured to forward the service traffic with the first service property to the Packet Radio Service Gateway Support Node via a first forwarding interface; and
   the Packet Radio Service Gateway Support Node forwarding the service traffic to the AS.

2. The system of claim 1, wherein the AP further connects with an Internet and is further configured to forward Internet service traffic with a second property to the Internet via a second forwarding interface.

3. The system of claim 1, wherein the AP is further configured to forward Internet service traffic to the Packet Radio Service Gateway Support Node via the first forwarding interface; and
   the Packet Radio Service Gateway Support Node is further configured to forward the Internet service traffic to the Internet.

4. The system of claim 1, further comprising a Circuit Switched (CS) domain, wherein the AP is further configured to receive CS service traffic from an MS, to encapsulate the CS service traffic, and to forward the encapsulated CS service traffic to the CS domain.

5. The system of claim 4, further comprising:
   an Access Gateway (AG) configured to forward the CS service traffic received from the AP to the CS domain, wherein the AP is further configured to send the encapsulated CS service traffic to the CS domain via the AG.

6. The system of claim 1, further comprising:
   an Access Gateway (AG) configured to configure the first forwarding interface in the AP according to a control plane signal received from the AP and to send a configured forwarding interface parameter to the AP.

7. An Access Point (AP) in a communication system, the AP comprising:
   a NodeB function unit;

a Radio Network Controller (RNC) function unit; and a packet data protocol (PDP) forward function unit;

wherein the RNC function unit is configured to receive service traffic with a first service property, and to forward the service traffic with the first service property to the PDP forward function unit; and wherein the PDP forward function unit is configured to forward the service traffic with the first service property to a Packet Radio Service Gateway Support Node via a first forwarding interface.

8. The AP of claim 7, wherein the PDP forward function unit is further configured to forward Internet service traffic with a second service property to the Packet Radio Service Gateway Support Node via the first forwarding interface connecting to the Packet Radio Service Gateway Support Node, or to directly send the Internet service traffic to Internet via a second forwarding interface.

9. The AP of claim 7, wherein:

the Radio Network Controller function unit is configured to receive the service traffic with the first service property, and to forward the service traffic with the first service property to the PDP forward function unit; or is configured to receive Circuit Switched (CS) service traffic, to encapsulate the CS service traffic, and to forward the encapsulated CS service traffic to a CS domain.

10. The AP of claim 8, wherein:

the Radio Network Controller function unit, is configured to receive the service traffic with the first service property or the service traffic with the second service property, and to forward the service traffic with the first service property or the service traffic with the second service property to the PDP forward function unit; or is configured to receive Circuit Switched, CS service traffic, to encapsulate the CS service traffic, and to forward the encapsulated CS service traffic to a CS domain.

11. The AP of claim 9, wherein the PDP forward function unit exchanges information with the Radio Network Controller function unit in a General Tunnel Protocol (GTP) packet format.

12. A radio access method in a communication system, the communication system having an Access Point in communication with an Application Server (AS) providing services having service traffic with a first service property, the method comprising:

receiving, by the Access Point, service traffic with the first service property; and forwarding, by the Access Point, the service traffic with the first service property to the AS via a Packet Radio Service Gateway Support Node, wherein the Access Point comprises a NodeB function unit, a Radio Network Controller function unit and a packet data protocol, PDP, forward function unit, wherein the Radio Network Controller function unit receives the service traffic with the first service property, and forwards the service traffic with the first service property to the PDP forward function unit for forwarding the service traffic.

13. The method of claim 12, further comprising:

receiving, by the Access Point, Internet service traffic with a second service property; and forwarding, by the Access Point, the Internet service traffic to an Internet via the Packet Radio Service Gateway Support Node or directly to the Internet.

14. The method of claim 12, further comprising:

encapsulating Circuit Switched (CS) service traffic;

forwarding the encapsulated CS service traffic to a gateway; and forwarding by the gateway, the received CS service traffic to the CS domain.

15. The method of claim 12, further comprising:

determining, by the Access Point, the service property of the service traffic according to an Access Point Name (APN) or a destination IP address of uplink data packet corresponding to the service traffic.

* * * * *